(12) United States Patent
Parker et al.

(10) Patent No.: US 8,025,508 B2
(45) Date of Patent: Sep. 27, 2011

(54) SOLAR PANEL GROUNDING CONNECTOR

(75) Inventors: Justin L. Parker, Billerica, MA (US); Michael Rzasa, Nashua, NH (US); Craig E. Lawson, Amherst, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 12/928,215

(22) Filed: Dec. 7, 2010

(65) Prior Publication Data

US 2011/0151703 A1 Jun. 23, 2011

Related U.S. Application Data

(60) Provisional application No. 61/284,786, filed on Dec. 23, 2009.

(51) Int. Cl.
*H01R 4/66* (2006.01)
(52) U.S. Cl. .......................................................... 439/92
(58) Field of Classification Search .................... 439/92, 439/95, 338, 574, 775–812; 248/316.7
See application file for complete search history.

(56) References Cited

U.S. PATENT DOCUMENTS

| | | | |
|---|---|---|---|
| 3,528,050 A | 9/1970 | Hindenburg | 339/95 |
| 4,087,149 A | 5/1978 | Fischer | 339/95 D |
| 4,327,887 A * | 5/1982 | Kumakura | 248/73 |
| 4,345,807 A * | 8/1982 | Shekel et al. | 439/174 |
| 4,355,852 A * | 10/1982 | Bachle | 439/92 |
| 4,384,753 A * | 5/1983 | Mixon, Jr. | 439/92 |
| 4,406,505 A | 9/1983 | Avramovich | 339/14 R |
| RE32,863 E | 2/1989 | Edwards | 84/314 |
| 4,875,876 A * | 10/1989 | O'Loughlin | 439/431 |
| 5,041,012 A * | 8/1991 | Caprio | 439/413 |
| 5,108,055 A * | 4/1992 | Kreinberg et al. | 248/71 |
| 5,164,545 A * | 11/1992 | Kreinberg et al. | 174/94 R |
| 5,451,167 A | 9/1995 | Zielinski et al. | 439/92 |
| 5,967,805 A | 10/1999 | Auclair et al. | 439/100 |
| 6,045,414 A * | 4/2000 | DeFrance | 439/794 |
| 6,106,310 A * | 8/2000 | Davis et al. | 439/95 |
| 6,186,799 B1 | 2/2001 | Mello | 439/92 |
| 6,234,835 B1 | 5/2001 | Bakker et al. | 439/553 |
| 6,840,782 B1 * | 1/2005 | Borden et al. | 439/92 |
| 6,855,012 B2 | 2/2005 | An | 439/793 |
| 7,252,558 B2 * | 8/2007 | Cottle | 439/822 |
| 7,666,024 B2 * | 2/2010 | De France | 439/479 |
| 7,834,487 B2 * | 11/2010 | Netz | 307/326 |
| 2009/0068873 A1 | 3/2009 | Kulig | 439/321 |

* cited by examiner

*Primary Examiner* — Briggitte R Hammond
(74) *Attorney, Agent, or Firm* — Harrington & Smith

(57) ABSTRACT

An electrical connector including a first section adapted to receive a first electrical conductor; a second section, and a rotatable connection between the first and second section. The second section has a channel adapted to receive a portion of a frame of a solar panel. The second section is adapted to spring clip onto the solar panel frame and make an electrical connection therewith. The rotatable connection is adapted to rotate the first section relative to the second section to orient the first electrical conductor at a desired orientation relative to the solar panel.

21 Claims, 8 Drawing Sheets

SOLAR PANEL GROUNDING CONNECTOR

CROSS REFERENCE TO RELATED APPLICATION

This application claims priority under 35 USC 119(e) on U.S. Provisional Patent Application No. 61/284,786 filed Dec. 23, 2009 which is hereby incorporated by reference in its entirety.

BACKGROUND OF THE INVENTION

1. Field of the Invention

The invention relates to an electrical connector and, more particularly, to a connector for connecting a frame of a member to a ground conductor.

2. Brief Description of Prior Developments

Grounding conductors are known. For example. U.S. Patent Publication No. 2009/0068873 A1 discloses a grounding clamp for an I beam. Solar panels, placed on a roof of a building for example, should be connected to ground. There is a desire to provide an electrical ground connector for a solar panel which is relatively easy to install, and which does not interfere with the solar cells of the panel or the mechanical mounting of the solar panels.

SUMMARY

The following summary is merely intended to be exemplary. The summary is not intended to limit the scope of the claimed invention.

In accordance with one aspect of the invention, an electrical connector is provided including a first section adapted to receive a first electrical conductor; a second section, and a rotatable connection between the first and second section. The second section has a channel adapted to receive a portion of a frame of a solar panel. The second section is adapted to spring clip onto the solar panel frame and make an electrical connection therewith. The rotatable connection is adapted to rotate the first section relative to the second section to orient the first electrical conductor at a desired orientation relative to the solar panel.

In accordance with another aspect of the invention, an electrical connector is provided comprising a first section adapted to receive a first electrical conductor; and a second section connected to the first section. The second section comprises a channel adapted to receive a portion of a frame of a solar panel. The second section is adapted to be spring clip mounted onto the solar panel frame and make an electrical connection therewith. The second section comprises finger contact sections adapted to be squeezed towards each other by fingers of a user to open the channel. Ends of the finger contact sections contact each other when the second section is stationarily attached to the solar panel frame to visually indicate a proper connection of the second section to the solar panel frame.

In accordance with another aspect of the invention, a method is provided comprising providing a first connector section, wherein the first connector section is adapted to receive a first electrical conductor; providing a second connector section, wherein the second connector section comprises a channel adapted to receive a portion of a frame of a solar panel, wherein the second connector section is adapted to be spring clip mounted onto the solar panel frame and make an electrical connection therewith; and connecting the first connector section to the second connector section by a rotatable connection, wherein the rotatable connection is adapted to rotate the first connector section relative to the second connector section to orient the first electrical conductor at a desired orientation relative to the solar panel.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 1:
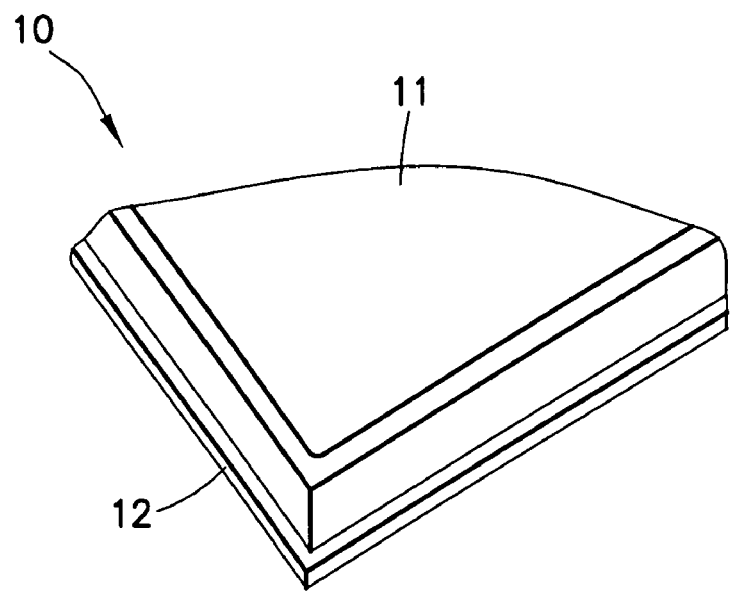
FIG. 1 is a partial perspective view of a solar panel.
Figure 2:
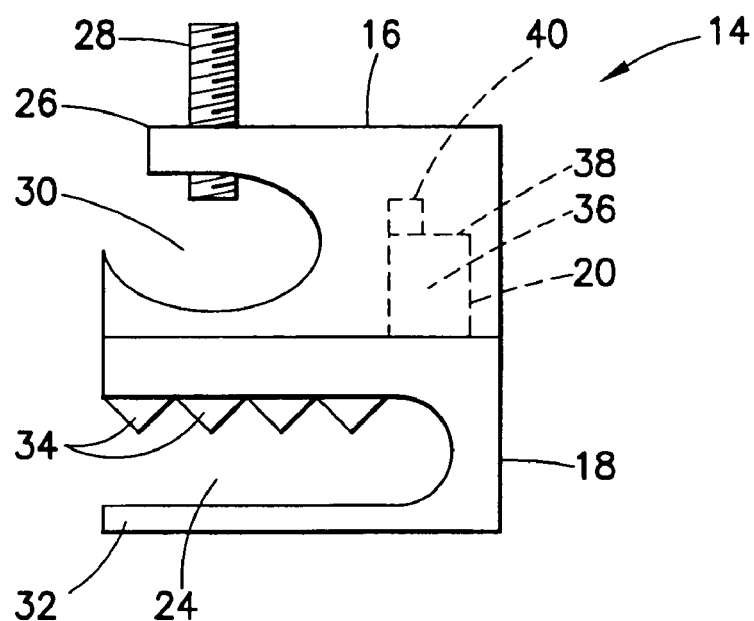
FIG. 2 is a side view of an electrical grounding connector comprising features of the invention.
Figure 3:
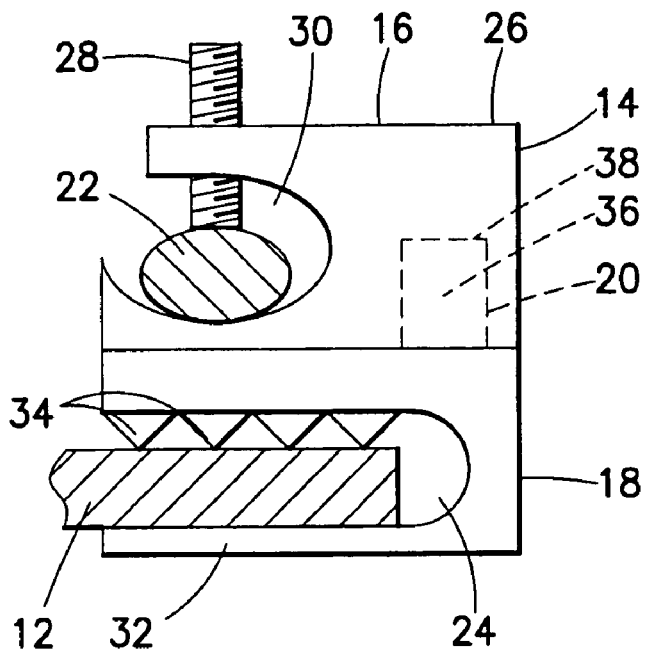
FIG. 3 is a side view of the electrical grounding connector shown in FIG. 2 attaching a ground conductor to the solar panel shown in FIG. 1.

Referring to FIG. 1, there is shown a partial perspective view of a solar panel 10. The solar panel 10 is adapted to generate electricity based upon sunlight. The solar panel 10 includes a frame 12 comprised of metal. Referring also to FIGS. 2-3, a side view of an electrical grounding connector 14 comprising features of the invention is shown. Although the invention will be described with reference to the example embodiments shown in the drawings, it should be understood that the invention can be embodied in many alternate forms of embodiments. In addition, any suitable size, shape or type of elements or materials could be used.

The connector 14 is provided to connect the frame 12 of the solar panel 10 to ground. The grounding connector 14 generally comprises a first section 16, a second section 18 and a rotatable connection 20 between the first and second sections.

The first section 16 is adapted to receive a first electrical conductor or ground conductor 22, such as a wire connected to ground. In this embodiment the first section 16 comprises a frame 26 and a fastener 28. The frame 26 is preferably comprised of metal. The frame 26 includes a conductor receiving area 30. The fastener 28 is movably attached to the frame 26 to be able to stationarily clamp a portion of the conductor 22 against the frame 26 in the conductor receiving area 30. In the embodiment shown, the fastener 28 comprises a set screw which is threadingly connected to the frame 26. However, in alternate embodiments any suitable type of fastener or system for fixedly attaching the conductor 22 to the first section 16 could be provided.

The second section 18 has a channel 24 adapted to receive a portion of the frame 12 of the solar panel. The second section 18 is preferably comprised of metal. The second section 18 has a cantilevered arm 32 at the bottom of the channel 24. This arm 32 is adapted to resiliently deflect in a general cantilever fashion. In this embodiment the portion of the second section 18 opposite the arm 32 has teeth or projections 34 which extend into the channel 24.

The second section 18 is adapted to spring clip mount onto the solar panel frame 12 and make an electrical connection therewith. As seen in FIG. 3, when the portion of the frame 12 is inserted into the channel 24, the arm 32 is adapted to resiliently deflect outward from the channel and allow the frame 12 to enter the channel 24. The teeth 34 are adapted to scratch the surface of the frame 12 to allow the teeth to make a good electrical contact with the frame in the channel. In an alternate embodiment additional or alternative means for fixedly electrically connecting the second section 18 to the frame 12 could be provided.

The rotatable connection 20 is adapted to allow the first section 16 to rotate relative to the second section 18. This rotatable connection can allow orientation of the electrical conductor 22 at a desired orientation relative to the solar panel 10. More specifically, the available location on the panel 10, which the ground connector 14 might be able to be mounted, could vary or be limited for different locations or mounting situations of the solar panel. It would not be desired to have the ground conductor 22 extend relative to the panel in certain directions, such as across the solar collector portion 11 of the panel 10 for example. The rotatable connection 20 of the two sections 16, 18 relative to each other allows the angle or orientation which the conductor 22 extends away from the connector 14 to be varied based upon actual conditions and situations relating to the panel 10 location and mounting, such as being able to rotate 90 degrees for example.

Figure 4:
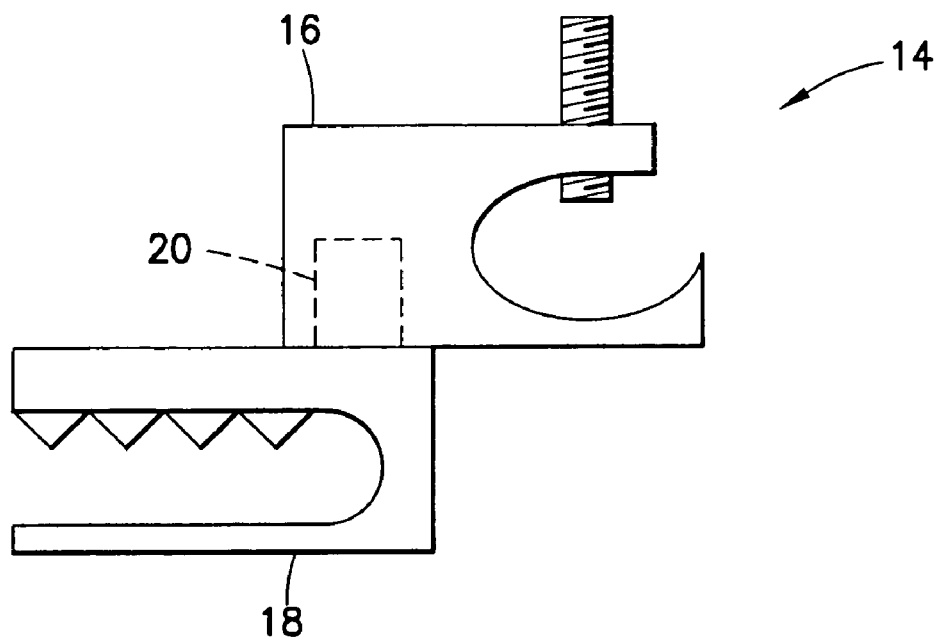
FIG. 4 is a side view of the electrical grounding connector shown in FIG. 2 in a second configuration or position.
Figure 5:
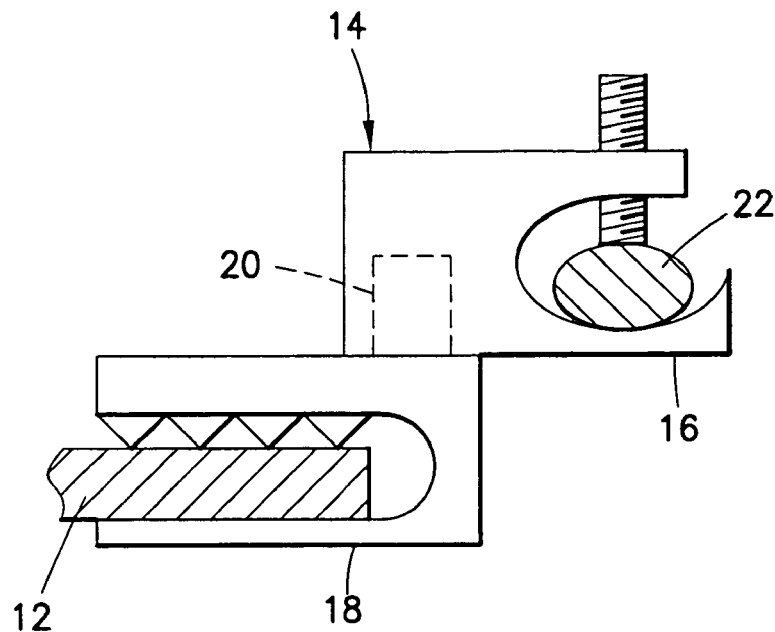
FIG. 5 is a side view of the electrical grounding connector shown in FIG. 4 attaching the ground conductor to the solar panel shown in FIG. 1.

In the embodiment shown, the rotatable connection 20 comprises a pivot post 36 of the second section 18 extending into a pivot hole 38 of the first section 16. However, in alternate embodiments any suitable rotatable connection structure for rotatably connecting the first and second sections relative to each other could be provided. In the embodiment shown, the rotatable connection 20 allows the first section 16 to be rotated 360 degrees relative to the second section 18. However, in alternate embodiments the angle of rotation could be limited to less than 360 degrees, such as only 90 degrees, or only 180 degrees, or only 90 degrees in two directions relative to the home position shown in FIGS. 2-3 for example. A rotation limiter 40 (see FIG. 2) could be provided for this purpose. FIGS. 4-5 show an example of the first and second sections 16, 18 at a second position relative to each other versus the first relative position shown in FIGS. 2-3, respectively. In addition, rather than only rotation, the connection 20 between the first and section sections 16, 18 could comprise an additional or alternative movement; such as linear sliding movement for example.

With the embodiment shown in FIGS. 2-5, the spring clip nature of the second section 18 allows the second section 18 to be easily and very quickly connected to the frame 12. The second section 18 can merely be spring clip mounted to the frame 12 with the teeth 34 bighting into the frame 12 to form a mechanically fixed stationary connection, and a good electrical connection which penetrates through any paint or corrosion of the surface of the frame 12. Additional crimping of the second section 18 on the frame 12 could also be provided. If additional crimping or other fixation of the second section 18 on the frame 12 is provided, movement of the first section 16 out of the way, as shown swung away in FIG. 4 for example, can allow for access to the top and bottom sides of the second section 18 without risk of damaging the first section 16.

The ground conductor 22 can be attached to the first section 16 before or after connection of the second section 18 to the frame. This could provide easier and faster connection of the ground conductor 22 to the connector 14 based upon actual field conditions of how or where the solar panel is located and surrounding members or surrounding other solar panels. Solar panels are often mounted together in groups against each other, and it might be desirable to making a grounding connection to each of the solar panel frames.

Figure 6:
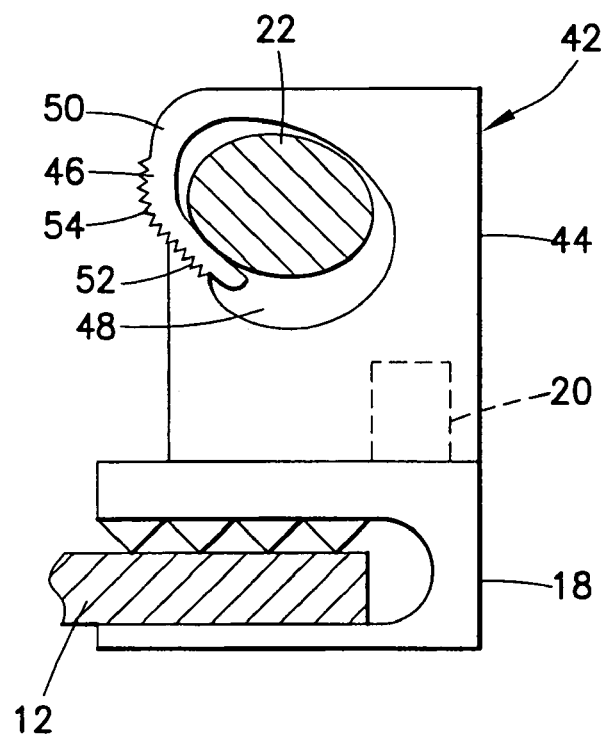
FIG. 6 is a side view of an alternate embodiment of the connector shown in FIGS. 2-4 attaching the ground conductor to the solar panel shown in FIG. 1.

Referring also to FIG. 6, an alternate embodiment of the ground connector is shown. In this embodiment the ground connector 42 comprises a first section 44, the second section 18 and the movable connection 20. The first section 44 comprises a one-piece metal member 46 forming a ground conductor receiving area 48 and having a deflectable arm 50. The member 46 comprises ratchet teeth 52 in the receiving area 48. The arm 50 comprises ratchet teeth 54 adapted to engage the ratchet teeth 52. The arm 46 can be pushed into the receiving area 48, with the teeth 52, 54 engaging each other, to fixedly clamp the ground conductor 22 in the receiving area 48. This example embodiment illustrates that features of the invention could be used with different types of mechanical connections of the ground conductor 22 to the first section.

Figure 7:
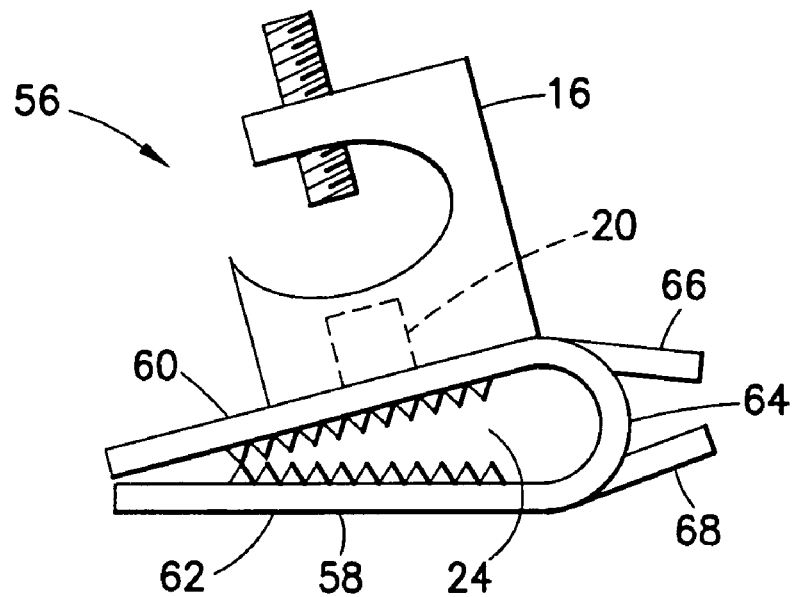
FIG. 7 is a side view of an alternate embodiment of the connector shown in FIGS. 2-4.

Referring also to FIG. 7, an alternate embodiment of the ground connector is shown. In this embodiment the ground connector 56 comprises the first section 16, a second section 58 and the movable connection 20. The second section 58 comprises a channel 24' (similar to channel 24) adapted to receive a portion of the frame 12 therein. The second section 58 is a spring clip adapted to spring clip mount onto the frame 12. In this embodiment, the second section 58 comprises a top arm 60, a bottom arm 62, and a connecting section 64. The top arm 60 has a finger contact section 66 which extends past the connecting section 64. The bottom arm 62 has a finger contact section 68 which extends past the connecting section 64.

Figure 8:
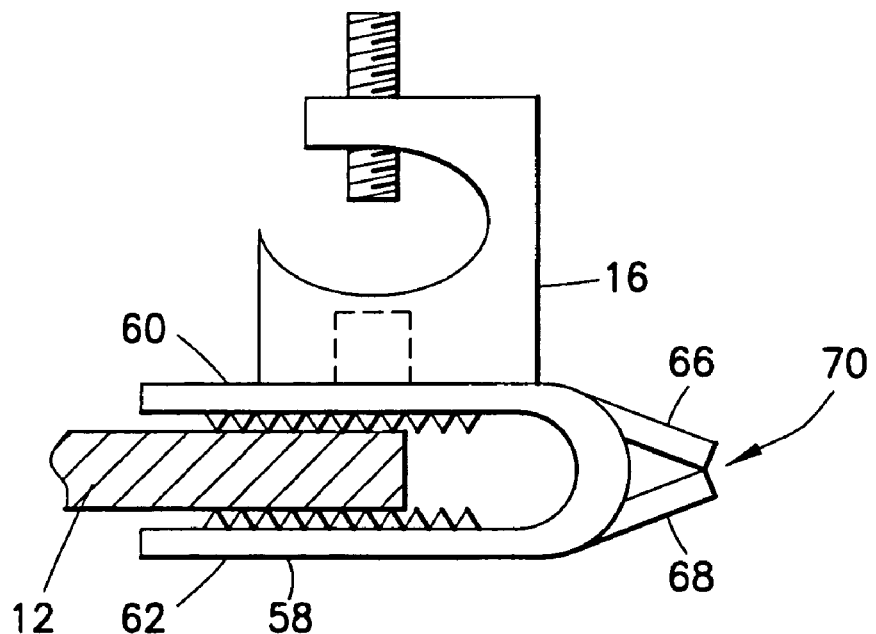
FIG. 8 is a side view of the electrical grounding connector shown in FIG. 7 attached to the solar panel shown in FIG. 1.

Referring also to FIG. 8, a user can press the finger contact sections 66, 68 towards each other to move the front ends of the arms 60, 62 and thereby open the entrance to the channel 24' for the frame 12. The user can then release the finger contact sections 66, 68 to allow the connecting section 64 to bias the arms 60, 62 back towards each other and thereby clamp the frame 12 in the channel 24'. In this embodiment the surfaces of the arms 60, 62 at the channel 24' comprise teeth, similar to the teeth 34, to penetrate past any dirt or corrosion or paint on the frame 12 to thereby provided a good electrical contact between the teeth and the frame 12.

In this embodiment, as shown by arrow 70, the second section 58 is sized and shaped relative to the frame 12 such that the outer ends of the finger contact sections 66, 68 contact each other after the second section 58 is properly mounted to the frame 12 at a final position. The finger contact sections 66, 68 could resiliently deflect during the mounting operation. The fact that the ends of the finger contact sections 66, 68 contact each other after the second section 58 is mounted to the frame 12 provides a means or system to quickly and easily visually indicate to a person that a proper connection of the second section 58 to the solar panel frame 12 has been made. In alternate embodiments, other types of visual indicators to quickly and easily visually indicate to a person that a proper connection of a spring clip connection section 58 to the solar panel frame 12 has been made could be provided.

Figure 9:
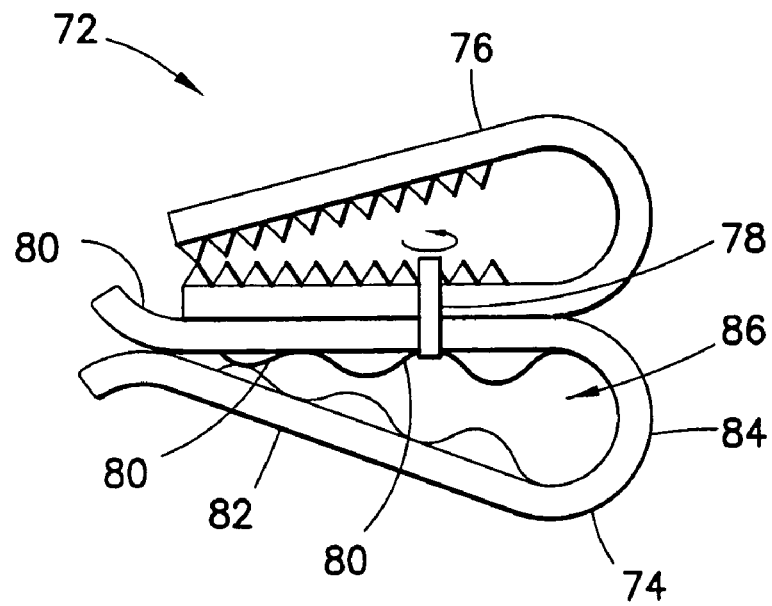
FIG. 9 is a side view of an alternate embodiment of the connector shown in FIGS. 2-4.

Referring also to FIG. 9, another alternate embodiment is shown. In this embodiment the ground connector 72 comprises a first section 74 connected to a second section 76 by a rotatable connection 78. The second section 76 is identical to the second section 58 except that it does not have finger contact sections 66, 68. However, in an alternate embodiment the second section 76 could include the finger contact sections 66, 68. The first section 74 has a spring clip design with an inner arm 80, an outer arm 82, and a connecting section 84. A user can press a ground conductor (such as a wire or cable for example) into the channel 86 between the front end of the arms 80, 82. The connecting section 84 can resiliently deflect to accommodate this deflection of the arms 80, 82 away from each other. In this embodiment the surfaces of the arms 80, 82 at the channel comprise opposing grooves 88 which can cooperate to capture the ground conductor therein. Different size grooves 80 are provided for different size ground conductors. Similar to the other embodiments described above, the first and second sections 74, 76 can rotate relative to each other to accommodate any "real estate" or connector mounting considerations available on the frame 12 (or mounting of the panel 10 to another member).

Figure 10:
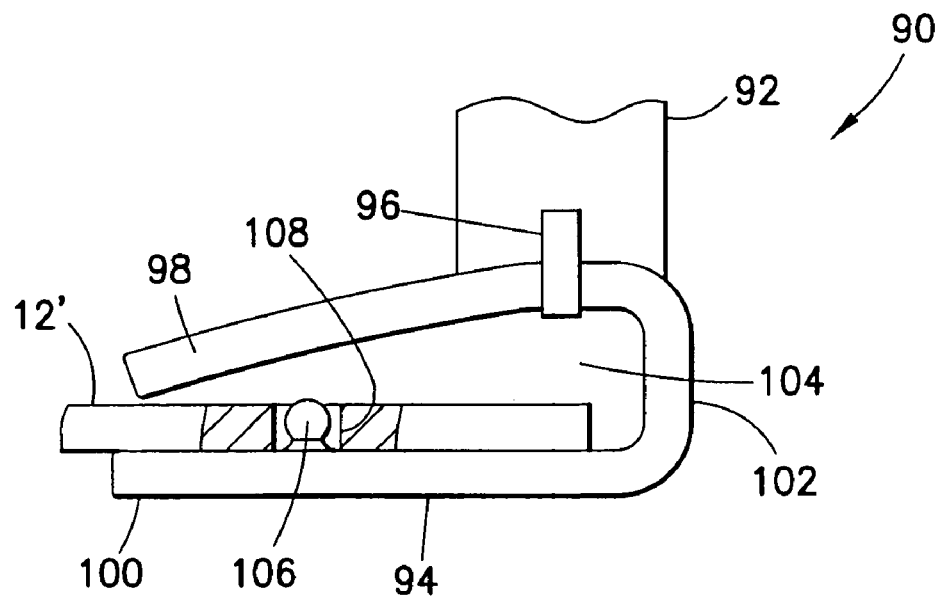
FIG. 10 is a side view of an alternate embodiment of the connector shown in FIGS. 2-4 attached is an alternate frame of the solar panel shown in FIG. 1.
Figure 11:
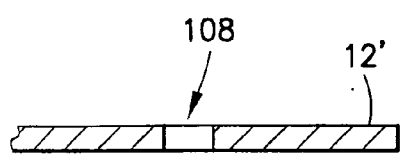
FIG. 11 is a cross section of the portion of the frame shown in FIG. 10.
Figure 12:
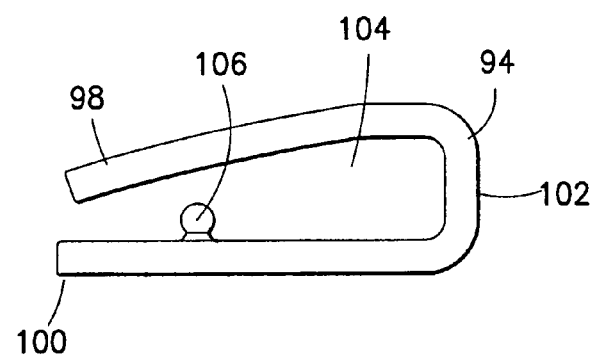
FIG. 12 is a side view of the second section of the connector shown in FIG. 10.

Referring also to FIGS. 10-12, another alternate embodiment of the invention is shown. In this embodiment the ground connector 90 comprises a first section 92 connected to a second section 94 by a rotatable connection 96. The first section 92 could be identical to the first section 16 or 44 or 76 for example. The second section 94 has a general spring clip design, but does not have the finger contact sections 66, 68. However, in an alternate embodiment the second section 94 could include the finger contact sections 66, 68. The second section 94 has a spring clip design with an inner arm 98, an outer arm 100, and a connecting section 102. A user can press the frame 12' into the channel 104 between the front end of the arms 98, 100. The connecting section 102 can resiliently deflect to accommodate this deflection of the arms 98, 100 away from each other. In this embodiment the inner surface of the arm 100 has a projection 106. The frame 12' has a recess or hole 108. When the portion of the frame 12' is inserted into the channel 104, the projection 106 can interlock into the hole 108 to thereby provide a mechanical interlocked connection of the ground connector to the frame 12' in addition to the spring clip electrical connection of the arms 98, 100 against opposite sides of the portion of the frame 12'.

Figure 13:
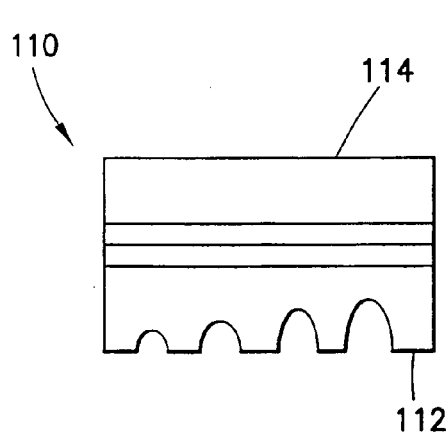
FIG. 13 is a front view of an alternate embodiment of the connector shown in FIGS. 2-4.
Figure 14:
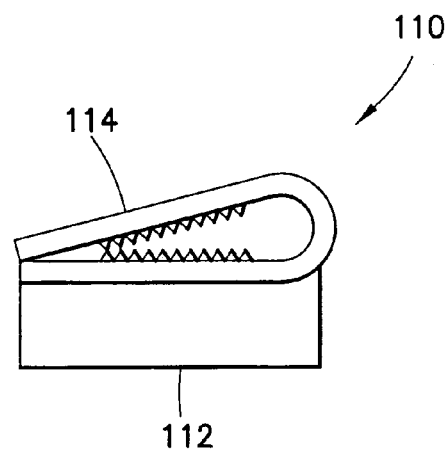
FIG. 14 is a side view of the connector shown in FIG. 13.

Referring also to FIGS. 13-14 another alternate embodiment of the invention is shown. In this embodiment the ground connector 110 comprises a first section 112 and a second section 114. In this embodiment the first and second sections 112, 114 are stationarily connected to each other. However, in an alternate embodiment the connection could be movable or rotatable as described above with reference to the other embodiments. The second section 114 is identical to the second section 76. Although the second section 114 does not have finger contact sections 66, 68, in an alternate embodiment the second section 114 could include the finger contact sections 66, 68. The first section 112 comprises a series of grooves 116. The grooves have different sizes. The grooves 116 are sized and shaped to have one or more ground conductors (such as a ground wire or cable) press fit mounted into the groove. The different size grooves allow the connector 110 to be used with ground conductors having different diameters.

Figure 15:
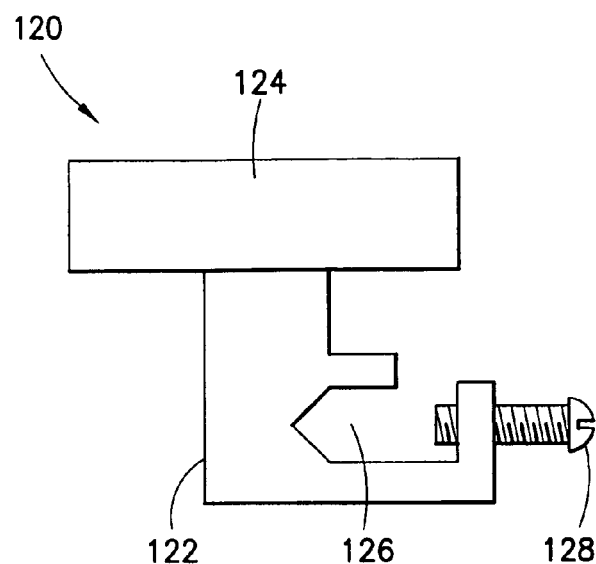
FIG. 15 is a front view of an alternate embodiment of the connector shown in FIGS. 2-4.
Figure 16:
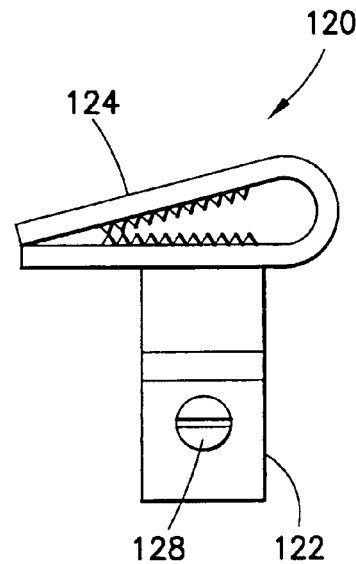
FIG. 16 is a side view of the connector shown in FIG. 15.

Referring also to FIGS. 15-16 another alternate embodiment of the invention is shown. In this embodiment the ground connector 120 comprises a first section 122 and a second section 124. In this embodiment the first and second sections 122, 124 are stationarily connected to each other. However, in an alternate embodiment the connection could be movable or rotatable as described above with reference to the other embodiments. The second section 124 is identical to the second section 76. Although the second section 124 does not have finger contact sections 66, 68, in an alternate embodiment the second section 124 could include the finger contact sections 66, 68. The first section 122 comprises a conductor receiving groove 126 and a fastener 128. The fastener 128, in this embodiment, is a screw. The screw 128 is threadingly attached to the first section 122 to be able to clamp a ground conductor in the groove 126. The orientation of the first section 122 to the second section 124 is such that the ground conductor can exit from the ground connector 120 parallel to projection of the frame of the solar panel into the channel of the second section 124.

Figure 17:
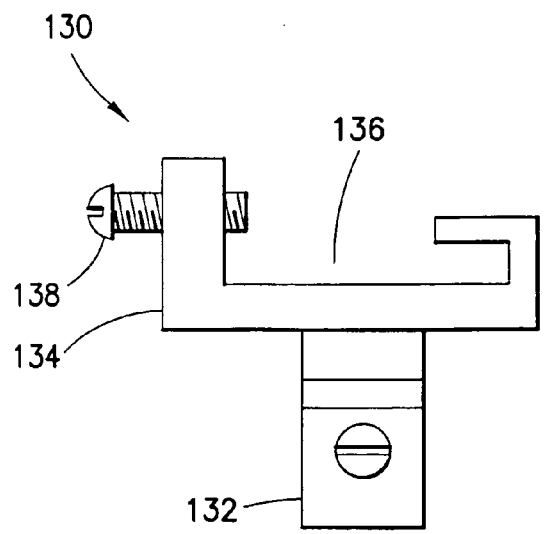
FIG. 17 is a front view of an alternate embodiment of the connector shown in FIGS. 2-4.
Figure 18:
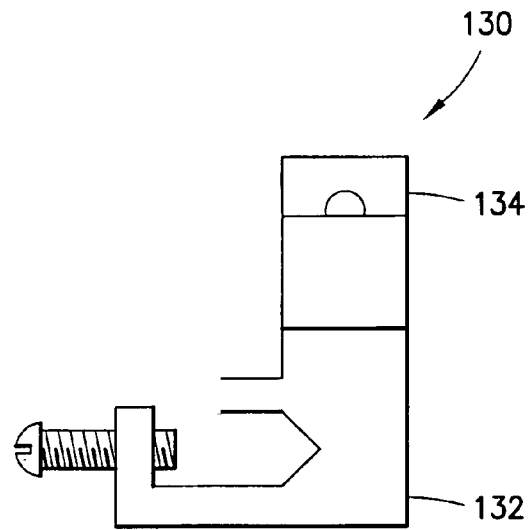
FIG. 18 is a side view of the connector shown in FIG. 17.

Referring also to FIGS. 17-18 another alternate embodiment of the invention is shown. In this embodiment the ground connector 130 comprises a first section 132 and a second section 134. In this embodiment the first and second sections 132, 134 are stationarily connected to each other. However, in an alternate embodiment the connection could be movable or rotatable as described above with reference to the other embodiments. The first section 132 is identical to the first section 122. The second section 134 comprises a frame portion receiving groove 136 and a fastener 138. The fastener 138, in this embodiment, is a thumb screw. The screw 138 is threadingly attached to the second section 134 to be able to clamp a portion of the frame 12 in the groove 136. The orientation of the first section 132 to the second section 134 is about 90 degrees offset from each other.

Figure 19:
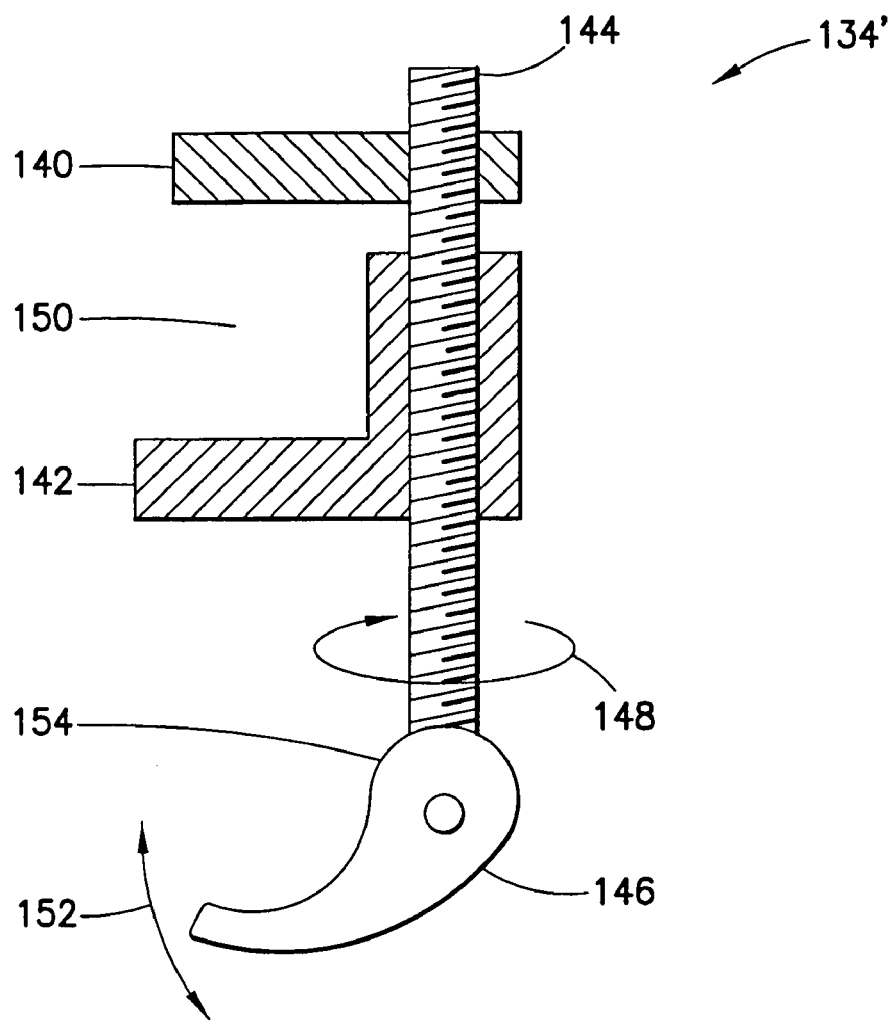
FIG. 19 shows an alternate embodiment of a second section of a ground connector.

Referring also to FIG. 19, a different embodiment for the second section 134 is shown. In this embodiment the second section 134' comprises a first part 140, a second part 142, a screw 144, and a lever cam 146. The screw 144 is threadingly connected to second part 142. The lever cam 146 is connected to the screw 144 to allow the screw to be rotated by rotating the lever cam as indicated by arrow 148. A user can rotate the lever cam 146 in direction 148 to cause the screw 144 to move the second part 142 towards the first part 140. Thus, rotation of the lever cam 146 in direction 148 can allow a portion of the frame 12 to be clamped in area 150 between the first and second parts 140, 142. Once initially clamped, the lever cam 146 can be rotated as indicated by arrow 152 such that surface 154 can cam the second member 142 closer to the first member 140 and thereby fixedly clamp the two members 140, 142 against the frame 12 for a stationary fixed mechanical and electrical connection.

Figure 20:
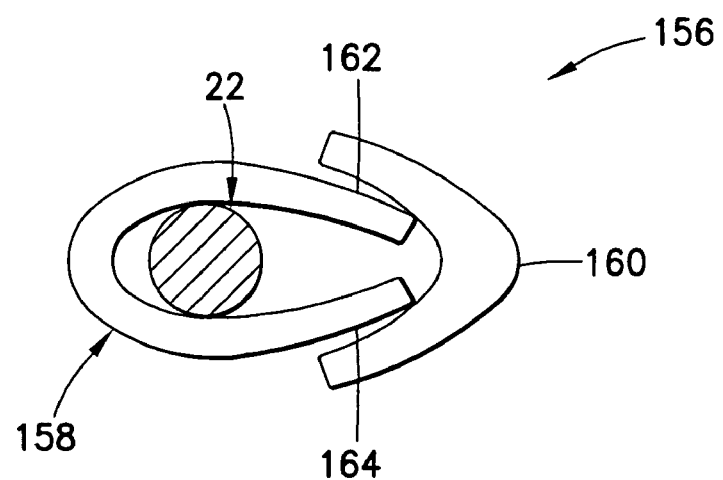
FIG. 20 is a side view of another alternate embodiment of the first section of a ground connector.

Referring also to FIG. 20, a different embodiment for the first section is shown. In this embodiment the first section 156 comprises a first spring clip 158 which is adapted to spring clip attached to the ground conductor 22. The first section 156 also comprises a second spring clip 160. The second spring clip 160 is adapted to spring clip attached to the first spring clip 158 to apply additional mechanical and electrical connection force of the first spring clip on the ground conductor 22. In addition, the second spring clip 160 helps to close the slightly open end of the arms 162, 164 of the first spring clip 158.

With the invention, an electrical connector can be provided comprising a first section adapted to receive a first electrical conductor; a second section having a channel adapted to receive a portion of a frame of a solar panel, wherein the second section is adapted to spring clip onto the solar panel frame and make an electrical connection therewith; and a rotatable connection between the first and second sections. The rotatable connection can be adapted to rotate the first section relative to the second section to orient the first electrical conductor at a desired orientation relative to the solar panel. The first section can comprise a screw adapted to clamp against the first electrical conductor. The first section can comprise a deformable portion with a ratchet holding arm. The first section can comprise a conductor receiving channel adapted to fixedly mount the first electrical conductor in the conductor receiving channel by a press fit insertion of the first electrical conductor in the conductor receiving channel. The first section can comprise a plurality of different size conductor receiving channels. The first section can comprise a spring clip with portions of the conductor receiving channels on opposing sides of the spring clip. The second section can comprise a scratch feature adapted to scratch a surface of the solar panel frame. The scratch feature can comprise teeth on an inside surface of the channel. The second section can comprise a general C shape. The second section can comprise finger contact sections adapted to be squeezed towards each other by fingers of a user to open the channel. Ends of the finger contact sections can be sized and shaped to contact each other when the second section is stationarily attached to the solar panel frame to visually indicate a proper connection of the second section to the solar panel frame.

In accordance with another embodiment of the invention, an electrical connector can be provided comprising a first section adapted to receive a first electrical conductor; and a second section connected to the first section, wherein the second section comprises a channel adapted to receive a portion of a frame of a solar panel, wherein the second section is adapted to be spring clip mounted onto the solar panel frame and make an electrical connection therewith, wherein the second section comprises finger contact sections adapted to be squeezed towards each other by fingers of a user to open the channel, and wherein ends of the finger contact sections contact each other when the second section is stationarily attached to the solar panel frame to visually indicate a proper connection of the second section to the solar panel frame. The first section can comprise a screw adapted to clamp against the first electrical conductor. The first section can comprise a deformable portion with a ratchet holding arm. The first section can comprise a conductor receiving channel adapted to fixedly mount the first electrical conductor in the conductor receiving channel by a press fit insertion of the first electrical conductor in the conductor receiving channel. The first section can comprise a plurality of different size conductor receiving channels. The first section can comprise a spring clip with portions of the conductor receiving channels on opposing sides of the spring clip. The second section can comprise a scratch feature adapted to scratch a surface of the solar panel frame. The scratch feature can comprise teeth on an inside surface of the channel. The second section can comprise a general C shape.

A method of the invention can comprise providing a first connector section, wherein the first connector section is adapted to receive a first electrical conductor; providing a second connector section, wherein the second connector section comprises a channel adapted to receive a portion of a frame of a solar panel, wherein the second connector section is adapted to be spring clip mounted onto the solar panel frame and make an electrical connection therewith; and connecting the first connector section to the second connector section by a rotatable connection, wherein the rotatable connection is adapted to rotate the first connector section relative to the second connector section to orient the first electrical conductor at a desired orientation relative to the solar panel.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. An electrical connector comprising:
   a first section adapted to receive a first electrical conductor;
   a second section having a channel adapted to receive a portion of a frame of a solar panel, wherein the second section is adapted to spring clip onto the solar panel frame and make an electrical connection therewith; and
   a rotatable connection between the first and second sections,
   wherein the rotatable connection is adapted to rotate the first section relative to the second section to orient the first electrical conductor at a desired orientation relative to the solar panel.

2. An electrical connector as in claim 1 wherein the first section comprises a screw adapted to clamp against the first electrical conductor.

3. An electrical connector as in claim 1 wherein the first section comprises a deformable portion with a ratchet holding arm.

4. An electrical connector as in claim 1 wherein the first section comprises a conductor receiving channel adapted to fixedly mount the first electrical conductor in the conductor receiving channel by a press fit insertion of the first electrical conductor in the conductor receiving channel.

5. An electrical connector as in claim 1 wherein the first section comprises a plurality of different size conductor receiving channels.

6. An electrical connector as in claim 5 wherein the first section comprises a spring clip with portions of the conductor receiving channels on opposing sides of the spring clip.

7. An electrical connector as in claim 1 wherein the second section comprises a scratch feature adapted to scratch a surface of the solar panel frame.

8. An electrical connector as in claim 1 wherein the scratch feature comprises teeth on an inside surface of the channel.

9. An electrical connector as in claim 1 wherein the second section comprises a general C shape.

10. An electrical connector as in claim 1 wherein the second section comprises finger contact sections adapted to be squeezed towards each other by fingers of a user to open the channel.

11. An electrical connector as in claim 10 wherein ends of the finger contact sections are sized and shaped to contact each other when the second section is stationarily attached to the solar panel frame to visually indicate a proper connection of the second section to the solar panel frame.

12. An electrical connector comprising:
a first section adapted to receive a first electrical conductor; and
a second section connected to the first section, wherein the second section comprises a channel adapted to receive a portion of a frame of a solar panel, wherein the second section is adapted to be spring clip mounted onto the solar panel frame and make an electrical connection therewith, wherein the second section comprises finger contact sections adapted to be squeezed towards each other by fingers of a user to open the channel, and wherein ends of the finger contact sections contact each other when the second section is stationarily attached to the solar panel frame to visually indicate a proper connection of the second section to the solar panel frame.

13. An electrical connector as in claim 12 wherein the first section comprises a screw adapted to clamp against the first electrical conductor.

14. An electrical connector as in claim 12 wherein the first section comprises a deformable portion with a ratchet holding arm.

15. An electrical connector as in claim 12 wherein the first section comprises a conductor receiving channel adapted to fixedly mount the first electrical conductor in the conductor receiving channel by a press fit insertion of the first electrical conductor in the conductor receiving channel.

16. An electrical connector as in claim 12 wherein the first section comprises a plurality of different size conductor receiving channels.

17. An electrical connector as in claim 16 wherein the first section comprises a spring clip with portions of the conductor receiving channels on opposing sides of the spring clip.

18. An electrical connector as in claim 12 wherein the second section comprises a scratch feature adapted to scratch a surface of the solar panel frame.

19. An electrical connector as in claim 12 wherein the scratch feature comprises teeth on an inside surface of the channel.

20. An electrical connector as in claim 1 wherein the second section comprises a general C shape.

21. A method comprising:
providing a first connector section, wherein the first connector section is adapted to receive a first electrical conductor;
providing a second connector section, wherein the second connector section comprises a channel adapted to receive a portion of a frame of a solar panel, wherein the second connector section is adapted to be spring clip mounted onto the solar panel frame and make an electrical connection therewith; and
connecting the first connector section to the second connector section by a rotatable connection, wherein the rotatable connection is adapted to rotate the first connector section relative to the second connector section to orient the first electrical conductor at a desired orientation relative to the solar panel.

\* \* \* \* \*